United States Patent Office 3,526,582
Patented Sept. 1, 1970

3,526,582
PROCESS FOR PRODUCING PYRIDOXAL-5-PHOSPHATE
Masao Tanaka, Kazuyuki Mineura, and Seigo Takasawa, Machida-shi, Japan, assignors to Kyowa Hakko Kogyo Co., Ltd., Chiyoda-ku, Tokyo, Japan, a corporation of Japan
No Drawing. Filed July 27, 1967, Ser. No. 656,320
Claims priority, application Japan, July 28, 1966, 41/49,081; Sept. 14, 1966, 41/60,330; Oct. 4, 1966, 41/64,946
Int. Cl. B01j 1/10
U.S. Cl. 204—158  20 Claims

ABSTRACT OF THE DISCLOSURE

Process for producing pyridoxal-5-phosphate which comprises oxidizing pyridoxine-5-phosphate or pyridoxamine-5-phosphate in the presence of a compound which can form an electron transfer complex therewith; the latter include isoalloxadines, alloxadines, lumazines, xanthines, thiazines, acridines, porphyrins, indamines, azo compounds, azines, anthraquinones, benzoquinones, aromatic amino compounds and indoles. The yield of pyridoxal-5-phosphate can be increased by including amino compounds in the reaction mixture. Various oxidation agents may be used for the reaction, but a photooxidation with air is preferred.

---

This invention relates to a process for producing pyridoxal-5-phosphate. More particularly, it relates to a process for the preparation of pyridoxal-5-phosphate by the oxidation of pyridoxine-5-phosphate or pyridoxamine-5-phosphate. Even more particularly, the invention relates to a process for the preparation of pyridoxal-5-phosphate by oxidizing said phosphate compounds photochemically in the presence of a compound which can form an electron transfer complex therewith.

Processes for producing pyridoxal-5-phosphate, that is, 2-methyl-3-hydroxy-4-formyl-5-pyridyl methylphosphoric acid, have been known in the prior art. For example, the phosphorination of pyridoxal, the oxidation of pyridoxine-5-phosphate or pyridoxamine-5-phosphate and the oxidative deamination or the transamination of pyridoxamine-5-phosphate are reactions which have been used to produce pyridoxal-5-phosphate. However, severe reaction conditions cannot be employed because of the instability of the desired product, i.e., pyridoxal-5-phosphate, and the yield is too low. Thus, in addition to the above mentioned reactions, an enzymic oxidation process for forming pyridoxal-5-phosphate from pyridoxamine-5-phosphate has been employed. This reaction has been considered as being a relatively excellent process. However, even in this reaction, the reaction conditions are still too severe because of the instability of the final product, with the result that the yield thereof is quite unstable. Accordingly, there have been many problems both from the economical and technical viewpoints in attempting to produce pyridoxal-5-phosphate on an industrial scale.

Since pyridoxal-5-phosphate is a biochemically active form of vitamin $B_6$, it finds wide use as a medicine and as an additive to foods and fodders. It also plays an important role as a coenzyme in the various enzyme reactions in the body. It would thus be quite advantageous to have on hand an efficient process for the production thereof.

Accordingly, one of the objects of the present invention is to provide an improved process for the preparation of pyridoxal-5-phosphate which overcomes the disadvantages and deficiencies of the prior art methods.

Another object of the present invention is to provide a process for producing pyridoxal-5-phosphate which may be carried out in an efficacious manner.

A further object of the invention is to provide a process for the preparation of pyridoxal-5-phosphate which may be carried out advantageously on an industrial scale at low cost to give a high yield of product.

These and other objects and advantages of the present invention will become apparent to those skilled in the art from a consideration of the following specification and claims.

In accordance with the present invention, it has been found that an excellent process for producing pyridoxal-5-phosphate is obtained by photooxidizing pyridoxine-5-phosphate or pyridoxamine-5-phosphate under mild conditions in the presence of a catalyst.

As the result of basic studies on the oxidation of the phosphoric acid ester of vitamin $B_6$ with enzymes, the present inventors have found that pyridoxine-5-phosphate or pyridoxamine-5-phosphate can be photooxidized under remarkably mild conditions in the presence of flavin mononucleotide, a coenzyme thereof or other flavin compounds, even in the absence of the enzyme. This fact, unknown heretofore in the prior art literature, forms the basis of the present invention. Further studies on this reaction mechanism have made it clear that the present oxidation reaction is very important as a particular enzyme model reaction. Using the new basic information relating to the reaction mechanism which is involved, the present inventors have accomplished the present invention which provides a new process for producing pyridoxal-5-phosphate by the oxidation of pyridoxine-5-phosphate or pyridoxamine-5-phosphate.

The basic characteristic of the present invention is the photochemical oxidation of pyridoxine-5-phosphate or pyridoxamine-5-phosphate under remarkably mild conditions in the presence of a compound which can form an electron transfer complex [cf. Bunshi Seibutsu Gaku (Asakura Shoten), pp. 422–429 (1963)] with the pyridoxine-5-phosphate or the pyridoxamine-5-phosphate to obtain pyridoxal-5-phosphate.

Various compounds may be employed for forming an electron transfer complex with pyridoxine-5-phosphate or pyridoxamine-5-phosphate. These compounds serve as the oxidation catalyst in the present invention. Compounds whose absorption bands shift in the ultraviolet or visible part of the spectrum in the presence of pyridoxamine-5-phosphate, pyridoxine or pyridoxine-5-phosphate may be employed.

Compounds having such properties and which may be employed as the electron transfer complex former include, for example, compounds such as isoalloxadine derivatives, for example, riboflavin, flavin mononucleotide, flavin adenine dinucleotide, lumiflavin, lumichrome, etc.; alloxadine and lumazine derivatives or other nitrogen-containing, oxygen-containing or sulfur-containing compounds which have similar electron-transfer properties, for example, xanthines such as fluorescein, eosine, etc.; thiazine compounds such as Thioflavine, Clayton Yellow, etc.; indamines such as Toluylene Blue etc.; azo compounds such as Methyl Orange, azobenzene sulfonic acid, etc.; azines such as Neutral Red, Safranine-O, etc., anthraquinones such as nitroanthraquinone sulfonic acid; benzoquinones and indole compounds such as indole and tryptophan.

In addition to the above mentioned compounds which can form an electron transfer complex, amino compounds, for example, aniline, sulfanilic acid and aminobenzoic acid; aminoalcohols such as ethanolamine, propanolamine, tris-(hydroxymethyl)-aminoethane, i.e., 2-amino-2-hydroxymethyl-1,3-propane diol, etc.; and amino acids such as glutamic acid and glutamine can increase the yield of pyridoxal-5-phosphate, effectively. By carrying out the reaction of the present invention in the presence of one of these compounds or mixtures thereof at the same time with a catalyst, pyridoxal-5-phosphate can be produced in good yield. Some of these amino compounds, however, themselves have catalytic activity in the oxidation reaction. In the case of such compounds, both effects are observed to a certain extent when the amino compounds are used alone, with the result that the formation of pyridoxal-5-phosphate is obtained.

The concentration of starting material, catalyst and amino compounds in the reaction mixture may be varied within wide limits. A satisfactory effect is obtained when 0.1–10 mg./ml. of starting material and 0.01–0.1 molar ratio of catalyst with respect to the amount of starting material are used together with an amino compound at a molar ratio of 1:1 or more with respect to the amount of starting material. However, it is preferable to use a molar ratio of amino compound to starting material of from 10:1 to 20:1 in order to obtain the most advantageous results.

Any solvent which can dissolve the starting material and the catalyst and which can form the complex may be employed as the reaction solvent. Water is the preferred solvent, both from the technical and the economic point of view.

The oxidation may be promoted by various oxidizing agents. However, a particularly strong oxidizing agent is not needed since pyridoxine-5-phosphate and pyridoxamine-5-phosphate is already chemically in a state which is readily amenable to oxidation. Furthermore, if the oxidizing agent is too strong, the yield of final product is lessened because of the reoxidation of the product, pyridoxal-5-phosphate. Therefore, air oxidation often gives the most desirable results. The yield is also lowered if the amount of catalyst is excessive. Either one of the suitable catalysts for the reaction may be employed alone, or mixtures of two or more may be used. The most important consideration is that the catalysts have a proper activity and that it not be used excessively.

The pH of the reaction solution is advantageously kept near the neutral point. However, the reaction proceeds smoothly at any pH within the range of 5.0–11.0. The reaction proceeds sufficiently at room temperature, however, a temperature between 30° C. and 60° C. is preferred.

The oxidation reaction is effected in the presence of visible or ultraviolet light and, therefore, it is necessary to operate the reaction under suitably illuminated conditions. However, under the illuminated conditions, care must be taken to prevent irradiation by an excessively strong light, for this will decompose the desired product. The preferred amount of illumination, if such be used, is from 1,000 to 20,000 luxes.

If the oxidation reaction of the present invention is carried out under the above-mentioned reaction conditions, the starting material is sufficiently oxidized to give pyridoxal-5-phosphate in good yield. After the completion of the reaction, the produced pyridoxal-5-phosphate can be easily purified to separate crystals thereof by a conventional purification process. Different analyses, such as various physical and chemical constants, ultraviolet and infrared absorption spectra, color tests with phenylhydrazine and the like, confirm that the product obtained is, in fact, pyridoxal-5-phosphate. This conclusion is also reached by observing its coenzyme activity to apotryptophanase prepared from cells of *Escherichia coli*.

The following examples are given merely as illustrative of the present invention and are not to be considered as limiting. This is particularly true with respect to the specific catalysts shown, as it is possible to employ many other compounds in addition to those mentioned below. Unless otherwise noted, the percentages therein are by weight.

EXAMPLE 1

An aqueous solution containing 500 $\mu$g./ml. of pyridoxamine-5-phosphate and 50 $\mu$g./ml. of riboflavin, and having a pH of 7.5, is stirred at 30° C., under an illumination of 10,000 luxes, for 60 hours. Air is bubbled through to produce 305 $\mu$g./ml. of pyridoxal-5-phosphate in the reaction solution, as measured by an enzyme method.

One liter of reaction solution is passed through one liter of a strongly basic ion exchange resin, Dowex 1X8 (a product of Dow Chemical Co., Ltd.) (Cl type), and washed sufficiently with water to wash away the riboflavin.

The resin which was used to adsorb the unreacted pyridoxamine-5-phosphate and the produced pyridoxal-5-phosphate is first washed with a 0.005 N HCl aqueous solution to elute pyridoxamine-5-phosphate, and then with 0.01 N hydrochloric acid to elute pyridoxal-5-phosphate. About 200 ml. of aqueous solution containing the thus separated pyridoxal-5-phosphate is neutralized with sodium hydroxide and passed through a column packed with 250 ml. of a strongly acidic ion exchange resin, Amberlite XE-100 (a product of Rohm and Haas) (H type). The adsorbed pyridoxal-5-phosphate is eluted with water, and the pH of the separated solution is adjusted to 4.0 with potassium hydroxide and filtered off. The filtrate is concentrated under reduced pressure at 30°–40° C. to a volume of about 10 ml. and left to stand to cool with the addition of ethanol to precipitate the potassium salt of pyridoxal-5-phosphate. This is filtered off and recrystallized to obtain 213 mg. of the potassium salt of pyridoxal-5-phosphate.

The crystals of the final product have a melting point of 209°–213° C. (decomposed); its IR and UV spectra are the same as those of a standard sample, and it shows a coenzyme activity to apotryptophanase and biological activity to *Saccharomyces carlsbergensis*.

EXAMPLE 2

An aqueous solution containing 250 $\mu$g./ml. of pyridoxamine-5-phosphate and 10 $\mu$g./ml. of flavin mononucleotide, and having a pH of 7.5, is air-oxidized under an illumination of 10,000 luxes, for 100 hours similarly as in Example 1 to produce 102 $\mu$g./ml. of pyridoxal-5-phosphate. It is treated thereafter similarly as in Example 1 to separate pyridoxal-5-phosphate in the form of crystals. Its activity with respect to apotryptophanase is then measured in order to confirm the identity of the final porduct.

EXAMPLE 3

An aqueous solution containing 500 $\mu$g./ml. of pyridoxamine-5-phosphate and 10 $\mu$g./ml. of N-dimethylalloxadine, and having a pH of 7.0, is oxidized for 200 hours under the same conditions as in Example 1 to produce 220 $\mu$g./ml. of pyridoxal-5-phosphate.

EXAMPLE 4

An aqueous solution containing 100 $\mu$g./ml. of pyridoxamine-5-phosphate and 10 $\mu$g./ml. of 6,7,8-trimethyllumazine, and having a pH of 6.5, is reacted under the same conditions as in Example 1 for 150 hours to produce 104 $\mu$g./ml. of pyridoxal-5-phosphate.

EXAMPLE 5

An aqueous solution containing 500 $\mu$g./ml. of pyridoxamine-5-phosphate and 10 $\mu$g./ml. of lumiflavin, and having a pH of 7.0, is subjected to oxidation for 240 hours under the same conditions as in Example 1 to obtain 118 $\mu$g./ml. of pyridoxal-5-phosphate.

EXAMPLE 6

An aqueous solution containing 100 $\mu$g./ml. of pyridoxine-5-phosphate and 10 $\mu$g./ml. of riboflavin, and having a pH of 7.5, is stirred with air bubbling through under an illumination of 10,000 luxes for 16 hours to obtain 66

μg./ml. of pyridoxal-5-phosphate in the reaction solution, as measured by an enzyme method. One liter of the reaction solution is passed through a resin column packed with 500 ml. of a strongly basic ion exchange resin, Dowex 1 X 8 (Cl type), and washed sufficiently with water to wash away the riboflavin. The resin layer which adsorbed the unreacted pyridoxine-5-phosphate and pyridoxal-5-phosphate is washed with a 0.005 N HCl aqueous solution to wash away pyridoxine-5-phosphate and then with 0.01 N hydrochloric acid to elute pyridoxal-5-phosphate. About 100 ml. of aqueous solution containing pyridoxal-5-phosphate is neutralized with sodium hydroxide and is then passed through a column packed with 100 ml. of a strongly acidic ion exchange resin, Amberlite XE-100 (H type). The adsorbed pyridoxal-5-phosphate is eluted with water and the pH of the eluted solution is adjusted to 4.0 with potassium hydroxide. The solution is then concentrated at 30°–40° C. under reduced pressure to a volume of about 10 ml. This is left to stand to cool with the addition of ethanol to precipitate crystals of the potassium salt of pyridoxal-5-phosphate. This salt is filtered off and recrystallized to obtain 53 mg. of the potassium salt of pyridoxal-5-phosphate.

The crystals of final product have a melting point of 206°–212° C. (decomposed) and the same IR and UV absorption spectra as those of a standard sample. The product shows a coenzyme activity to apotryptophanase and biological activity to *Saccharomyces carlsbergensis*.

EXAMPLE 7

An aqueous solution containing 250 μg./ml. of pyridoxine-5-phosphate and 10 μg./ml. of flavin monophosphate, and having a pH of 7.5, is subjected to oxidation for 120 hours similarly as in Example 6 to obtain 68 μg./ml. of pyridoxal-5-phosphate, as measured by apotryptophanase. The resulting product is treated thereafter similarly as in Example 1 to obtain pyridoxal-5-phosphate in the form of crystals.

EXAMPLE 8

An aqueous solution containing 500 μg./ml. of pyridoxine-5-phosphate and 10 μg./ml. of lumiflavin and having a pH of 7.0 is subjected to oxidation for 240 hours under the same conditions as in Example 1 to obtain 120 μg./ml. of pyridoxal-5-phosphate.

EXAMPLE 9

An aqueous solution containing 100 μg./ml. of pyridoxine-5-phosphate and 10 μg./ml. of 6,7,8-trimethyllumazine and having a pH of 6.5 is reacted for 120 hours similarly as in Example 1 to obtain 98 μg./ml. of pyridoxal-5-phosphate.

EXAMPLE 10

A 0.1 M phosphoric acid buffer solution containing 500 μg./ml. of pyridoxine-5-phosphate and 7 μg./ml. of riboflavin and 1 mg./ml. of sulfanilic acid, and having a pH of 7.5, is stirred with air bubbling through under an illumination of 10,000 luxes for 10 hours. As a result, 80.1 μg./ml. of pyridoxal-5-phosphate is obtained. The reaction solution is passed through a resin column packed with 500 ml. of a strongly basic ion exchange resin, Dowex 1 X 8 (Cl type), and washed sufficiently with water to wash away the riboflavin. The resin layer is washed with 0.005 N hydrochloric acid to elute the unrecated pyridoxine-5-phosphate and then with 0.01 N hydrochloric acid to elute pyridoxal-5-phosphate. 200 ml. of the thus eluted solution is neutralized with sodium hydroxide and then passed through a resin column packed with 100 ml. of a strongly acidic ion exchange resin, Amberlite XE-100 (H type), and then washed with water to elute pyridoxal-5-phosphate; sulfanilic acid is also removed therefrom. The pH of an aqueous solution containing pyridoxal-5-phosphate alone is adjusted to 4.0 with potassium hydroxide, and the solution is filtered off and then concentrated under reduced pressure below 40° C., to a volume of about 10 ml. The solution is left to stand to cool with the addition of ethanol to precipitate crystals of the potassium salt of pyridoxal-5-phosphate. The resulting crystals are filtered off and recrystallized to obtain 61 mg. of crystals.

The crystals of product have a melting point of 205°–212° C. (decomposed) and the same IR and UV absorption spectra as those of a standard sample. The product shows coenzyme activity to apotryptophanase and biological activity to *Saccharomyces carlsbergensis*.

EXAMPLE 11

A 0.1 M phosphate buffer solution containing 500 μg./ml. of pyridoxamine-5-phosphate, 5 μg./ml. of flavin mononucleotide and 1 mg./ml. of aniline, and having a pH of 8.0, is reacted for 4 hours similarly as in Example 1 to obtain 109 μg./ml. of pyridoxal-5-phosphate, as measured by apotryptophanase. The resulting product is treated thereafter similarly as in Example 1 to separate substantially pure crystals of pyridoxal-5-phosphate.

EXAMPLE 12

An aqueous solution containing 500 μg./ml. of pyridoxine 5-phosphate, 10 μg./ml. of 6,7,8-trimethyllumazine, 1 mg./ml. of aniline and 5 mg./ml. of 2-amino-2-hydroxymethyl-1,3-propanediol, and having a pH of 8.5, is reacted for 20 hours under the same conditions as in Example 1 to obtain 326 μg./ml. of pyridoxal-5-phosphate. The resulting product is treated thereafter similarly as in Example 1 to separate crystals of pyridoxal-5-phosphate.

EXAMPLE 13

An aqueous solution containing 500 μg./ml. of pyridoxamine-5-phosphate, 10 μg./ml. of lumiflavin, 1 mg./ml. of aniline and 5 mg./ml. of 1-amino-2-propanol, and having a pH of 8.0, is oxidized for 20 hours similarly as in Example 1 to obtain 297 μg./ml. of pyridoxal-5-phosphate.

EXAMPLE 14

A phosphate buffer solution containing 500 μg./ml. of pyridoxine-5-phosphate, 1 mg./ml. of sulfanilic acid and 5 mg./ml. of L-glutamic acid, and having a pH of 7.5, is reacted for 40 hours similarly as in Example 1 to obtain 98 μg./ml. of pyridoxal-5-phosphate.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing pyridoxal-5-phosphate which comprises oxidizing photochemically a phosphate compound selected from the group consisting of pyridoxine-5-phosphate and pyridoxamine-5-phosphate in the presence of a compound which is capable of forming an electron transfer complex with said phosphate compound and which is an electron acceptor.

2. The process of claim 1, wherein said compound capable of forming an electron transfer complex is selected from the group consisting of isoalloxadines, alloxadines, lumazines, xanthines, thiazines, acridines, porphyrins, indamines, azo compounds, azines, anthraquinones, benzoquinones, aromatic amino compounds, indoles and mixtures thereof.

3. The process of claim 1, wherein the oxidation reaction is carried out in water.

4. The process of claim 1, wherein said compound capable of forming an electron transfer complex is employed in a molar ratio of about 0.01 to 0.1 with respect to the amount of said phosphate compound.

5. The process of claim 1, wherein said phosphate compound is employed in a concentration of from 0.1 to 10 mg./ml.

6. The process of claim 1, wherein the oxidation is carried out in a reaction solution having a pH of between 5.0 and 11.0.

7. The process of claim 1, wherein the oxidation is carried out at a temperature of from about 30° to 60° C.

8. The process of claim 1, wherein the oxidation is carried out under an illumination of from 1000 to 20,000 luxes.

9. The process of claim 1, wherein an amine catalyst is also present in the reaction solution.

10. A process for producing pyridoxal-5-phosphate which comprises oxidizing photochemically a phosphate compound selected from the group consisting of pyridoxine-5-phosphate and pyridoxamine-5-phosphate in the presence of (A) at least one amino compound and (B) a compound which is capable of forming an electron transfer complex with said phosphate compound and which is an electron acceptor.

11. The process of claim 10, wherein said amino compound is selected from the group consisting of aliphatic amines, aromatic amines, heterocyclic amines, aminoalcohols and amino acids.

12. The process of claim 10, wherein said amino compound is employed in a molar ratio of from about 10:1 to 20:1 with respect to the amount of said phosphate compound.

13. The process of claim 10, wherein said compound capable of forming an electron transfer complex is selected from the group consisting of isoalloxadines, alloxadines, lumazines, xanthines, thiazines, acridines, porphyrins, indamines, azo compounds, azines, anthraquinones, benzoquinones, aromatic amino compounds, indoles and mixtures thereof.

14. The process of claim 10, wherein the oxidation reaction is carried out in water.

15. The process of claim 10, wherein said compound capable of forming an electron transfer complex is employed in a molar ratio of about 0.01 to 0.1 with respect to the amount of said phosphate compound.

16. The process of claim 10, wherein said phosphate compound is employed in a concentration of from about 0.1 to 10 mg./ml.

17. The process of claim 10, wherein the oxidation is carried out in a reaction solution having a pH of between 5.0 and 11.0.

18. The process of claim 10, wherein the oxidation is carried out at a temperature of from about 30° to 60° C.

19. The process of claim 10, wherein the oxidation is carried out under an illumination of from 1000 to 20,000 luxes.

20. The process of claim 10, wherein an amine catalyst is also present in the reaction solution.

References Cited

UNITED STATES PATENTS 2,599,587　6/1952　Shwartzman _____ 204—158

HOWARD S. WILLIAMS, Primary Examiner